United States Patent [19]

Mehta

[11] Patent Number: 5,241,031
[45] Date of Patent: Aug. 31, 1993

[54] ELASTIC ARTICLES HAVING IMPROVED UNLOAD POWER AND A PROCESS FOR THEIR PRODUCTION

[75] Inventor: Aspy K. Mehta, Humble, Tex.

[73] Assignee: Exxon Chemical Patents Inc., Linden, N.J.

[21] Appl. No.: 837,769

[22] Filed: Feb. 19, 1992

[51] Int. Cl.$^5$ .................... C08F 210/02; C08J 5/18
[52] U.S. Cl. .................... 526/348.1; 526/280; 526/281; 526/282; 526/283; 526/308; 526/336; 526/339; 526/348.5; 264/210.1; 264/210.2; 264/235; 264/235.6; 264/291; 264/331.13; 264/331.17; 264/346; 528/503
[58] Field of Search .......... 264/235.6, 235.8, 210.1, 264/210.2, 235, 291, 346, 331.17; 526/348.1, 336, 281, 282, 283, 308, 348.5, 339; 528/503

[56] References Cited

U.S. PATENT DOCUMENTS

| 2,261,832 | 11/1941 | Greenup | 264/235.6 X |
| 3,660,364 | 5/1972 | Longi et al. | 526/336 X |
| 3,684,782 | 8/1972 | Longi et al. | 526/336 X |
| 5,009,827 | 4/1991 | Abu-Isa et al. | 264/235.8 X |

OTHER PUBLICATIONS

Schwartz et al, Plastics Materials and Processes, Van Nostrand Reinhold Co., N.Y., 446-8 (1982).

Primary Examiner—Fred Teskin
Attorney, Agent, or Firm—Jaimes Sher; Robert W. Mulcahy; Ben C. Cadenhead

[57] ABSTRACT

Disclosed is a process for improving the unload power of a precursor elastic film comprising orienting the film to a draw ratio in the range of about 2:1 to about 20:1 followed by annealing. Further disclosed is an elastic film oriented to a draw ratio in the range of about 2:1 to about 20:1 and comprising a copolymer of ethylene polymerized with at least one comonomer selected from the group consisting of $C_3$ to $C_{20}$ alpha-olefins and $C_3$ to $C_{20}$ polyenes, wherein the copolymer has a density in the range of about 0.855 g/cm$^3$ to about 0.9 g/cm$^3$, a melt index in the range of about 0.5 to about 50, with a composition distribution index at least about 45 percent.

26 Claims, 4 Drawing Sheets

ELASTIC ARTICLES HAVING IMPROVED UNLOAD POWER AND A PROCESS FOR THEIR PRODUCTION

BACKGROUND OF THE INVENTION

1. Field of the Invention

This invention relates to elastic articles and a method for their production. More particularly this invention relates to ethylene-based plastomer articles having improved unload power and a process for their production. Even more particularly this invention relates to a plastomer precursor form which, by a post polymerization process of orienting and annealing, is made into an article having improved unload power as compared to the precursor article.

2. Brief Description of the Prior Art

Elastomeric polymers are utilized in a wide variety of applications for which nonelastic polymers are totally unsuited. For example, in articles of clothing, such elastomeric polymers are utilized as neck, wrist, waist, ankle and head bands. As the garment is worn, the elastic polymer band must have enough "unload power" to hold it in place. When the garment is not worn, it is generally desirable that the elastic polymer band have a low "residual set" so that the elastic polymer band of the garment returns essentially to its original shape. In addition, the elastic polymer band must also demonstrate a high degree of repeatability as the garment is worn over a long period of time. In terms of garment applications, these constraints dictate which of those elastomeric polymer compositions now known can be fabricated into article forms which can be placed into applications in garments.

"Unload power" is an important elastic tensile property in elastics applications, particularly for garment applications. For example, in diaper applications, the unload power of an elastomeric article provides an indication of the retractive force which holds the elastomeric article which is part of the diaper leg of the garment against the infant's body. In all elastomeric materials, the unload power is lower than the load power (the force required to extend the strip). This difference shows up as a hysteresis (i.e. the force to extend is different than the force to hold in place) and is larger for synthetic elastomers than in the case of a natural rubber.

"Residual set" refers to the change between the length of an elastomeric material before and after its extension to a certain length for a certain time for a certain number of cycles. For example, the percent change in length of a film after extension of the film to 200 percent of its initial length through 5 cycles. Each cycle would consist of extending the film to 200 percent of its initial length, holding the film extended for a time period, releasing the extending force, and allowing the film to return for a time period.

Typical elastic materials utilized for clothing applications include polyurethanes, ethylene-propylene rubbers (EP or EPR), including ethylene-propylene-diene terpolymers (EPDM), and natural rubbers.

Polyurethanes have the desired unload power, residual set and repeatability for use in most garment applications. However, polyurethanes have a relatively high specific gravity, which results in a lower yield of polyurethane articles hence a higher cost as compared to comparable lower specific gravity polymers. Furthermore, where the garment is to be used once and quickly discarded, such as with surgical garments or disposable diapers, polyurethanes as an element thereof are overengineered for the desired use of that garment and thus overly expensive.

For garment applications, conventional EPs and EPDMs have very poor intrinsic physical properties and for such applications generally must be blended with a plastic material such as low density polyethylene, linear low density polyethylene or ethylene vinyl acetate copolymers. Ideally, for suitability in such garment applications an EP and/or EPDM which does not need such blending has been desired.

For polyurethanes, EPs and EPDMs, to get an "accordion" shape or "gather" formation, such as around the leg opening of a disposable diaper, it has been necessary to expose that portion of the overall garment article to heat to cause shrinkage of the elastomeric article of the garment. Conventionally, used elastic materials require a relatively high shrinkage temperature. In addition, many of them require prestretching for good gather formation. Exposing the garment article to such a relatively high temperature may be detrimental to the overall properties of the garment. Further, the commonly used elastic materials generally have to be melt glued to achieve bonding to the garment, such as to a polyolefin layer in the garment. Controlled heat bonding to such a polyolefin substrate, if possible, would be advantageous.

A need exists for an elastic article that can be economically utilized in disposable garment applications. There also exists a need for use in garment applications for an elastic article with a relatively low shrinkage temperature. Additionally, there exists a need for an elastic article that can be heat bonded/sealed to polyolefins.

A need still exists for elastic articles of optimum quality for particular uses. It is still a desire of the art to provide elastic articles having high quality characteristics composed of ethylene based plastomers.

Accordingly, the present invention relates to elastic materials having improved unload powers, wherein the elastic materials comprise ethylene based plastomers made from metallocene catalysts. Such elastic materials having improved unload powers are produced by subjecting a precursor elastic film to orienting and annealing.

SUMMARY OF THE INVENTION

According to one embodiment of the present invention there is provided a process for improving the unload power of a precursor elastic film comprising orienting and annealing the precursor film. Preferably, the film comprises a copolymer of ethylene polymerized with at least one comonomer selected from the group consisting of $C_3$ to $C_{20}$ alpha-olefins and $C_3$ to $C_{20}$ polyenes, wherein the copolymer has a density in the range of about 0.855 g/cm$^3$ to about 0.9 g/cm$^3$, a melt index in the range of about 0.5 to about 50, with a Composition Distribution Breadth Index (CDBI) at least about 45 percent. The orientation of the film is to a draw ratio in the range of about 2:1 to about 20:1. The annealing is conducted at a temperature between the film softening point and melting point. The combination of orientation and annealing provides the opportunity for novel property profiles. Significant variation in the property profile can be achieved by controlling the amount of orientation and annealing adopted during the fabrication. While orientation of nonelastic films to improve clarity, impact strength and barrier properties is well known in the art, knowledge of the combination of orientation and annealing is not known for improving the unload power of elastics.

According to another embodiment of the present invention there is provided an elastic film orientated to a draw ratio in the range of about 2:1 to about 20:1 and comprising a copolymer of ethylene polymerized with at least one comonomer selected from the group consisting of $C_3$ to $C_{20}$ alpha-olefins and $C_3$ to $C_{20}$ polyenes, wherein the copolymer has a density in the range of about 0.855 g/cm$^3$ to about 0.9 g/cm$^3$, a melt index in the range of about 0.5 to about 50, with a Composition Distribution Breadth Index (CDBI) at least about 45 percent.

Preferably, the elastomer utilized in the present invention is a plastomer that is an ethylene based polymer made from a metallocene catalyst.

There are a number of structural variables which affect the ultimate properties of the plastomer. Two of the most important are composition distribution (CD) and molecular weight distribution. Composition distribution refers to the distribution of comonomer between copolymer molecules. This feature relates directly to polymer crystallizability, optical properties, toughness and many other important use characteristics. Molecular weight distribution plays a significant role in melt processability as well as the level and balance of physical properties achievable. Also important is the molecular weight (MW) of the polymer, which determines the level of melt viscosity and the ultimately desired physical properties of the polymer. The type and amount of comonomer also effects the physical properties and crystallizability of the copolymer.

The plastomers utilized in the present invention may be made by any suitable process which allows for the proper control of the above mentioned structural features (MW, MWD, CD, comonomer type and amount) to yield the desired polymer with the desired elastics properties. One suitable method is through the use of a class of highly active olefin catalysts known as metallocenes.

Metallocenes are well known especially in the preparation of polyethylene and copolyethylene-alpha-olefins. These catalysts, particularly those based on group IV B transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$, of about 2), to broad (as in a polydispersity of about 8).

Exemplary of the development of these metallocene catalysts for the polymerization of ethylene is U.S. Pat. No. 4,937,299 to Ewen et al. hereby incorporated by reference. Among other things, this patent teaches that the metallocene catalyst system may include a cocatalyst such as alumoxane, formed when water reacts with trialkyl aluminum with the release of methane, which alumoxane complexes with the metallocene compound to form the catalyst. However other cocatalysts may be used with metallocenes, such as trialkylaluminum compounds; or ionizing ionic compounds such as, tri(n-butyl)ammoniumtetra(pentafluorophenyl) boron, which ionize the neutral metallocene compound, such ionizing compounds may contain an active proton, or some other cation such as carbonium, which ionizing the metallocene on contact, forming a metallocene cation associated with (but not coordinated or only loosely coordinated to) the remaining ion of the ionizing ionic compound. Such compounds are described in U.S. application Ser. Nos. 008,800, and 133,480 (published as E.P.-A-0277004), U.S. application Ser. Nos. 011,471 and 133,052 (published as E.P.-A-0277003), all herein incorporated by reference.

DETAILED DESCRIPTION OF THE INVENTION

Figure 1:
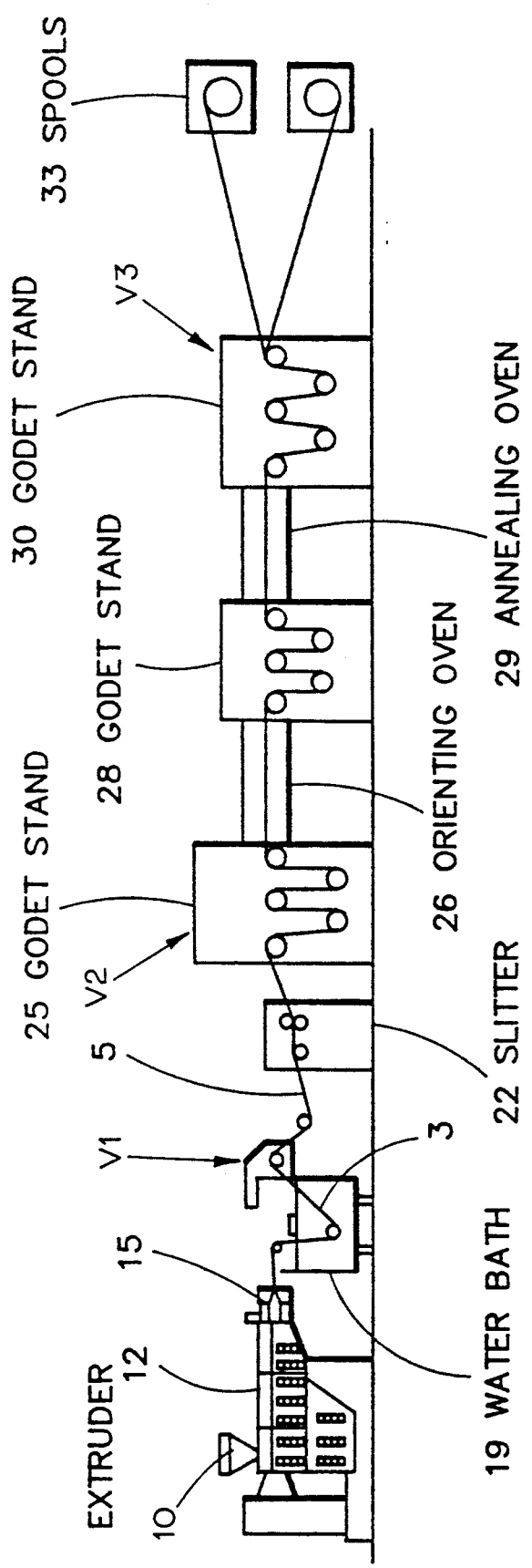
FIG. 1 is a schematic of the present invention showing the precursor film being made by the slit film extrusion process (also referred to as ribbon yarn extrusion process), wherein the melted polymer is extruded through a die to form the precursor film. Also shown are the orienting and annealing apparatus for making an elastic film having improved unload power.

The present invention provides a fabrication method for increasing the unload power of an elastic material. According to ASTM definitions relating to rubber, elastic materials are considered those materials which rapidly return to approximately their initial dimensions and shape after substantial deformation by a weak stress and release of the stress. In the present invention, elastic materials are considered those which when stretched to twice their original length (2×) at room temperature (18° to 29° C.) and held at 2× for one minute, will retract to less than 1.5× within one minute after the deforming force is released.

The present invention relates to elastic film having improved unload power produced by orienting and annealing a precursor elastic film. The precursor film is first formed by any suitable method. Once formed, the precursor film is then subjected to a combination of orienting and annealing to improve its unload power.

The precursor elastic film which is to be further processed to improve its unload power according to the method of the present invention may be produced by any suitable method. Methods of making film are discussed by J. H. Briston and L. L. Katan in *Plastic Films,* (2nd ed 1983), herein incorporated by reference. Commonly known methods of producing film which ma be utilized in the present invention include casting (extrusion and solvent), calendering and extrusion methods, such as blow extrusion or slit die extrusion. The present invention is suitable for improving the unload power of thin elastic articles. Such thin elastic articles are commonly known as ribbon, tape, film, strip, etc. The difference between these particular terms is generally dimensional. For example, tape is generally thought of as being narrower than film. In the present invention, the terms "ribbon", "tape", "film" and "strip" are generally interchangable, with the present invention suitable for application to thin elastic articles and not dimensionally limited.

Regardless of the method of producing the precursor film, once the precursor film has been produced, it must be further processed to improve unload power of the film. This is accomplished by a combination of orienting and annealing the precursor film.

Orientation of nonelastic films such as polypropylene, polystyrene, nylon and polyethylene terephthalate to improve clarity, impact strength and, particularly in the case of polypropylene, its barrier properties is well known in the art. However, while it is not known to orient and anneal elastic materials, the methods utilized on nonelastic film are generally suitable for use with in the present process for orienting elastic film.

The orienting and annealing of the film may be carried out monoaxially in the machine direction or the transverse direction or in both directions (biaxially) either simultaneously or sequentially using conventional equipment and processes following cooling of the precursor film.

Blown films are preferentially stretched in machine direction or in both directions whereas cast films are preferably stretched in the machine direction. Generally, for orientation in the machine direction, the precursor film is passed around two rollers driven at different surface speeds and finally to a take up roller. The second driven roller which is closest to the take up roll is driven faster than the first driven roller. As a consequence the film is stretched between the driven rollers. Conventional "godet" stands as are well known in the art may also be utilized.

Film orientation may also be carried out in a tentering device with or without machine direction orientation to impart transverse direction orientation in the film. The film is gripped by the edges for processing through the tentering device.

For most final applications, the precursor film is monoaxially oriented in the machine direction.

The morphology of the plastomer derived tapes can be viewed as a matrix of amorphous material interspersed with crystallites.

For orienting it is generally necessary that the film be heated to between its softening point and its melting point. This heating is necessary to allow extension or orientation to be induced into the film. Since the temperature is between the film softening point and melting point, the smaller imperfect crystallites will melt, whereas larger more perfect crystallites of the plastomer will remain. The molecules in the amorphous matrix become oriented or extended depending on the draw ratio and other material and fabrication parameters.

For annealing, the temperature is still between the film softening point and melting point. The annealing step is necessary to anneal or perfect the crystallites that survived the orienting step and to relax out stresses. This annealing aids in maintaining the orientation or extension induced in the orienting step. The annealing temperature is preferably less than the orienting temperature.

Generally once the film leaves the annealing step, ambient cooling is sufficient. In most cases, the film from the annealing step is then spooled in a winding unit.

Figure 2:
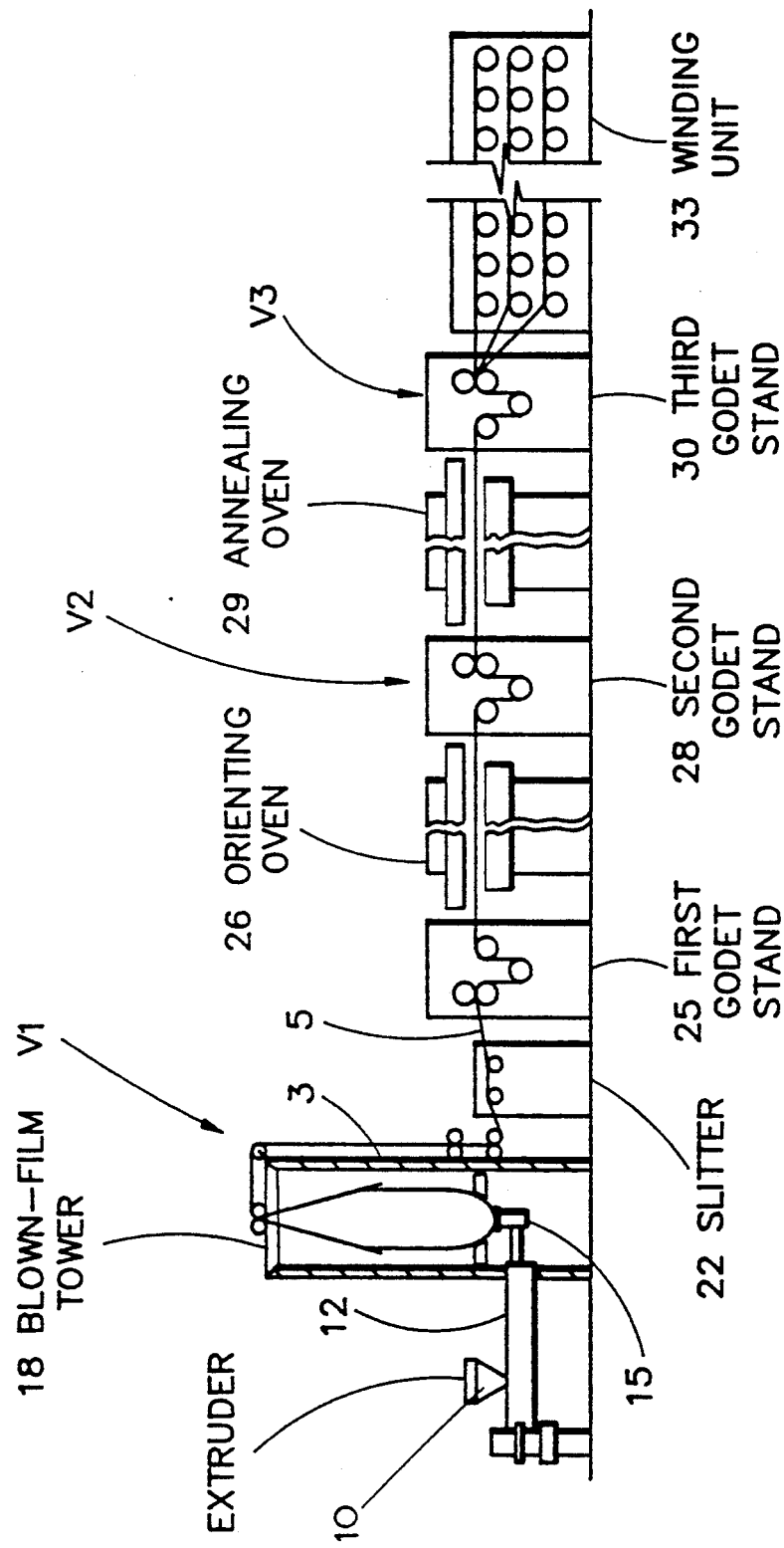
FIG. 2 is a schematic of the present invention showing the precursor film being made by the blown film process, wherein the melted polymer is blown into a tube and air cooled to form the precursor film. Also shown are the orienting and annealing apparatus for making an elastic film having improved unload power.

Suitable film making/orienting/annealing processes are shown in FIGS. 1 and 2 discussed below. A commercially available orientation line includes the Killion ribbon yarn line (model serial number 3874).

FIG. 1 shows a schematic of a slit film extrusion process. The elastic pellets are fed into hopper 10 of extruder 12. In extruder 12 the elastic pellets are heated to above their melting point and extruded through die 15 into film 3. Film 3 is subsequently cooled by quenching in water bath 19. Slitter 22 is an optional station that slits film 3 into two or more narrower tape sections 5. Orientation and annealing takes place utilizing first godet stand 25, second godet stand 28, third godet stand 30, orienting oven 26 and annealing oven 29. Tape 5 is subsequently wound into spools in winding unit 33. In the orienting and annealing ovens, the material is generally heated to a temperature above the softening point but less that its melting point.

FIG. 2 shows a schematic of a blown film extrusion process. The elastic pellets are fed into hopper 10 of extruder 12. In extruder 12 the elastic pellets are heated to above their melting point and extruded through die 15 into tube shaped film 3. Film 3 is subsequently air cooled in blown-film tower 18. Slitter 22 is an optional station that slits film 3 into two or more narrower tape sections 5. Orientation and annealing takes place utilizing first godet stand 25, second godet stand 28, third godet stand 30, orienting oven 26 and annealing oven 29. Tape 5 is subsequently wound into spools in winding unit 33.

In the process of the present invention, the draw ratio to which the film is oriented may be any ratio that will improve the unload power of the film to desired levels. In both FIGS. 1 and 2, $V_1$, $V_2$ and $V_3$ represent the film travel speed at various points as indicated. The draw ratio is the ratio of $V_2$ to $V_1$. Generally, the draw ratio of the drawn film will be at least 2:1, preferably at least 4:1 and most preferably at least 6:1. The upper limit on the draw ratio is generally limited by the properties of the elastic material utilized and the desired end properties of the drawn film. Generally, the draw ratio will not exceed 20:1, preferably the draw ratio will not exceed 10:1 and most preferably the draw ratio will not exceed 6:1.

Generally, $V_3$ is such that the film orientation can be maintained during the annealing step. This means that $V_3$ is generally at or near $V_2$.

In the present invention, the type of elastomer utilized will depend upon economics and the properties desired in the final end product. Generally the elastomer can be any of the group consisting of plastomer, styrene-butadiene copolymer, polychloroprene (neoprene), nitrile rubber, butyl rubber, polysulfide rubber (Thiokol), cis-1,4-polyisoprene, ethylene-propylene co and terpolymers (EPR and EPDM rubber), silicone rubber and polyurethane rubber. Preferably, the elastomer utilized in the present invention is a plastomer.

The term "PLASTOMER" as used herein refers generally to a class of ethylene based polymers with density of less than about 0.900 g/cm$^3$ (down to about 0.855 g/cm$^3$) at a molecular weight, $M_w$ greater than about 20,000 (about 200 MI and lower). Plastomers have an ethylene crystallinity between PLASTics (i.e. linear low density and very low density polyethylenes) and ethylene/alpha-olefin elastTOMERS.

The plastomer utilized in the present invention is selected from the group of polymers consisting of ethylene polymerized with at least one comonomer selected from the group consisting of $C_3$ to $C_{20}$ alpha-olefins and $C_3$ to $C_{20}$ polyenes. Preferably, the plastomer utilized in the present invention is selected from the group of polymers consisting of ethylene polymerized with at least one comonomer selected from the group consisting of $C_3$ to $C_{20}$ alpha-olefins. The types of monomers selected in the plastomer utilized in the present invention will depend upon economics and the desired end use of the resultant fabricated material.

The polyene utilized in the present invention generally has in the range of about 3 to about 20 carbon atoms. Preferably, the polyene has in the range of about 4 to about 20 carbon atoms, most preferably in the range of about 4 to about 15 carbon atoms. Preferably, the polyene is a diene, that generally has in the range of about 3 to about 20 carbon atoms. Preferably, the diene utilized in the present invention is a straight chain, branched chain or cyclic hydrocarbon diene preferably having from about 4 to about 20 carbon atoms, and most preferably from about 4 to about 15 carbon atoms, and still most preferably in the range of about 6 to about 15 carbon atoms. Most preferably, the diene is a nonconjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myrcene and dihydroocimene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicyclopentadiene, bicyclo-(2,2,1)-hepta-2-5-diene; alkenyl, alkylidene, cycloalkenyl and cycloalkylidene norbornenes such as 5-methylene-2-norborene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Particularly preferred dienes are 1,4-hexadiene, 5-ethylidene-2-norbornene, 5-vinyllidene-2 norbornene, 5-methylene-2-norbornene and dicyclopentadiene. The especially preferred dienes are 5-ethylidene-2-norbornene and 1,4-hexadiene.

Generally, the alpha-olefins suitable for use in the present invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

Preferably, the plastomers utilized in the material of the present invention are either ethylene/alpha-olefin copolymers or ethylene/alpha-olefin/diene terpolymers. Illustrative non-limiting examples of suitable copoymers are those such as ethylene/butene-1, ethylene/hexene-1, ethylene/octene-1, and ethylene/propylene copolymers. Suitable examples of terpolymers include ethylene/propylene/1,4-hexadiene and ethylene/butene-1/1,4-hexadiene.

The plastomers suitable in the present invention with desired monomer levels can be prepared by polymerization of the suitable monomers in the presence of supported or unsupported catalyst systems. Preferably the catalyst system utilized is a metallocene catalyst system.

The precise monomer content of the plastomers utilized in the present invention will depend upon economics and the desired applications of the resultant materials. Typically the plastomers utilized in the present invention, will generally comprise in the range of about 65 mole percent to about 93 mole percent ethylene (based on the total moles of monomer). Preferably, the plastomers have a minimum of 68 mole percent, most preferably, 73 mole percent ethylene. Preferably, the plastomers have a maximum of 91, most preferably, 88 mole percent ethylene. Preferably, the plastomers of the present invention, will generally comprise in the range of about 68 mole percent to about 91 mole percent ethylene, and most preferably in the range of about 73 mole percent to about 88 mole percent. The other monomers will comprise the balance of the plastomer.

The plastomers utilized in the present invention have an ethylene crystallinity less that about 35 percent. Preferably, the ethylene crystallinity is less than about 20 percent.

The plastomers utilized in the present invention have a density in the range of about 0.855 g/cm$^3$ to about 0.900 g/cm$^3$. Preferably, the plastomers have a minimum density of about 0.860 g/cm$^3$, most preferably about 0.865 g/cm$^3$. Preferably, the plastomers have a maximum density of about 0.890 g/cm$^3$, most preferably about 0.880 g/cm$^3$. Preferably the density is in the range of about 0.860 g/cm$^3$ to about 0.890 g/cm$^3$. Most preferably, the density is in the range of about 0.865 g/cm$^3$ to about 0.880 g/cm$^3$. Densities were measured using standard accepted procedures, except that they were additionally conditioned by holding them for 48 hours at ambient temperature (23° C.), prior to density measurement.

The melt index (MI) of the plastomers utilized in the present invention is such that the plastomer can be extruded into the desired end product. In addition, the MI must be such that the plastomer will have sufficient drawability as desired. Generally the melt index is in the range of about 0.2 dg/min to about 100 dg/min. Preferably, the MI is at least about 0.5 dg/min, most preferably at least about 1 dg/min. Preferably, the maxium MI is about 20 dg/min, most preferably about 5 dg/min. Preferably the MI is in the range of about 0.5 dg/min to about 50 dg/min, and most preferably in the range of about 1 dg/min to about 5 dg/min. MI as measured herein was determined according to ASTM D-1238 (190/2.16). High load MI was determined according to ASTM D-1238 (190/21.6).

The plastomers utilized in the present invention have a molecular weight distribution such that the polymer will have the desired drawability and be processable into the desired end product. The ratio of $M_w/M_n$ is generally in the range of about 1.5 to about 30. The maxium ratio is preferably about 10 and most preferably about 4. The minimum ratio is preferably about 1.8, most preferably about 2.0. Preferably the ratio is in the range of about 1.8 to about 10, and most preferably in the range of about 2.0 to about 4.0.

The composition distribution breadth index (CDBI) of the plastomers utilized in the present invention is generally about 45 percent or higher. Preferably, the CDBI is about 50 percent or higher. Most preferably, the CDBI is about 60 percent or higher, and ever more preferably, about 70 percent or higher. As used herein, the CDBI is defined as the weight percent of the copolymer molecules having a comonomer content within 50 percent (i.e. ±50%) of the median total molar comonomer content. The CDBI of linear polyethylene, which does not contain a comonomer, is defined to be 100%.

The Composition Distribution Breadth Index (CDBI) is determined via the technique of Temperature Rising Elution Fractionation (TREF). CDBI determination clearly distinguishes, for example, the plastomers utilized in this invention (narrow composition distribution as assessed by CDBI values of about 45% or higher) from products traditionally utilized in prior art (broad composition distribution as assessed by CDBI values generally less than 45%). The CDBI of a copolymer is readily calculated from data obtained from techniques known in the art, such as, for example, temperature rising elution fractionation as described, for example, U.S. application Ser. No. 151,350, filed Feb. 2, 1988 now U.S. Pat. No. 5,008,204, or in Wild et al., *J. Poly. Sci, Poly. Phys. Ed.*, vol. 20, p. 441 (1982). Unless otherwise indicated, terms such as "comonomer content", "average comonomer content" and the like refer to the bulk comonomer content of the indicated interpolymer blend, blend component or fraction on a molar basis.

The benefits to the discovery of the subject invention that accrue from the structural features of plastomers alluded to above (viz. molecular weight distribution, composition distribution, molecular weight, comonomer type and amount) are elucidated as follows. The narrow molecular weight distribution provides high strength and good draw down. The narrow composition distribution (high CDBI value) provides low tackiness and a low melting temperature/melting range (for heat shrinkage and "gather" formation at relatively low temperatures). The comonomer incorporation level in plastomers affords low specific gravity for high end product yields (e.g., yards/lb of polymer). Yet, plastomers have modest levels of ethylene crystallinity (around 20%) which give rise to orientability and strength in the fabricated elastic articles. Control of the molecular weight allows control of orientation and elasticity. Finally, plastomers are hydrocarbon-based and so chemically quite inert.

The plastomers useful in the present invention may be produced by any suitable method that will yield a polymer having the required properties, that when fabricated into an elastic article by the method of the present invention, will have suitable residual set and unload power properties. An illustrative nonlimiting example of a particularly suitable method of making the plastomer useful in the present invention utilizes a class of highly active olefin catalysts known as metallocenes, which are well known especially in the preparation of polyethylene and copolyethylene-alpha-olefins. These catalysts, particularly those based on group IV B transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$ of about 2), to broad (as in a polydispersity of about 8).

Exemplary of the development of these metallocene catalysts for the polymerization of ethylene are U.S. Pat. No. 4,937,299 to Ewen et al., U.S. Pat. No. 4,808,561 to Welborn, and U.S. Pat. No. 4,814,310 to Chang, all hereby incorporated by reference. Among other things, Ewen et al. teaches that the structure of the metallocene catalyst includes an alumoxane, formed when water reacts with trialkyl aluminum with the release of methane, which alumoxane complexes with the metallocene compound to form the catalyst. Welborn teaches a method of polymerization of ethylene with alpha-olefins and/or diolefins. Chang teaches a method of making a metallocene alumoxane catalyst system utilizing the absorbed water in a silica gel catalyst support.

Specific methods for making ethylene/alpha-olefin copolymers, and ethylene/alpha-olefin/diene terpolymers are taught in U.S. Pat. No. 4,871,705 to Hoel, and in U.S. application Ser. No. 207,672, filed Jun. 16, 1988 by Floyd et al now abandoned in favor of U.S. application Ser. No. 594,776 filed Oct. 10, 1990, respectively, both hereby incorporated by reference.

Utilizing a metallocene catalyst, the plastomers useful in the present invention can be produced in accordance with any suitable polymerization process, including a slurry polymerization, gas phase polymerization, and high pressure polymerization process.

The plastomer of the present invention may be fabricated into any form that is suitable for the use to which it will serve.

EXAMPLES

EXAMPLE 1

EXAMPLE I

Preparation of Ethylene/α-olefin Plastomer

| PROCESS SUMMARY | | | | | | | | | | |
|---|---|---|---|---|---|---|---|---|---|---|
| RXN TEMP. | | CO-MONOMER | C2=PRESS | | AVG C2= RXN | TOTAL | WET PROD | TOTAL | TOTAL | CAT. EFF. |
| TARGET (F) | ACTUAL (F) | CHARGE (LB) | TARGET (PSI) | ACTUAL (PSI) | RATE (LB/MIN) | C2= (LB) | WT (LB) | CAT (MG) | COCAT* (LB) | (LB/LB CAT) |
| 131 | 135.5 ± 3 | 201 (C6=) | 60 | 60 ± 2 | 0.15 | 60 | 150 | 35.4 | 7 | 19E5 |

*10 wt % solution in toluene

The catalyst system for polymerizing this ethylene copolymer comprised (n-butylcyclopentadienyl) zirconium dichloride as catalyst and a 10 wt % methylalumoxane in toluene solution as cocatalyst.

The polymerization was conducted in a batch mode using a diluent phase polymerization process. A 150 gallon pilot plant reactor was used to carry out the polymerization. Prior to charging the reactants the reactor vessel was rinsed with triethyl aluminum and purged with nitrogen. Isopentane diluent was then fed to the reactor via a mol-sieve bed to remove moisture. Next the required weights of hexene-1 comonomer and cocatalyst solution (10 wt % MAO in toluene) were charged.

The reactor contents were heated to reaction temperature. At thermal equilibrium, ethylene was slowly fed to the reactor until the pressure set point was reached.

Reaction was initiated by controlled addition of catalyst (3×10 mg charges). This was followed by addition, as needed, to build and sustain a controllable reaction. Reaction rate was monitored by noting reactor temperature and heat removal rates from the water heat exchanger. The reaction was killed after 60 lbs of ethylene had been fed to the reactor. Product recovery began by slowly venting the reactor to 5 psi, followed by adding water and, with a nitrogen purge to flare, heating the mixture to 165° F. to flash remove the isopentane and unreacted comonomer. The product was recovered from the reactor, compounded with Irganox-1076 stabilizer and melt extruded to screen out contaminants and pelletize the material.

The product was analyzed to have a Melt Index of 2.8, density of 0.88 g/cm$^3$ and a Melt Index Ratio ($I_{21.6}/I_{2.16}$) of 23. It will be recognized by persons skilled in the art that products With different Melt Indices and Densities to the above product can be obtained by adjusting the process conditions. Additionally, the composition of the product can be altered, depending on the choice of α-olefin comonomer.

EXAMPLE 2

Table 1 shows the description of the samples utilized in this example. Numbers 1 and 2 are the same plastomer sample made according to example 1 above. Number 1 was fabricated to a draw ratio of 5:1 according to the method of the present invention, whereas Number 2 was produced in a traditional cast film operation and was not subject to the combination of orientation and annealing as was Number 1. Numbers 3, 4 and 6 have appreciable levels of ethylene crystallinity and do not show good elastic response and extensibility by the fabrication of this method. Numbers 5, 6 and 7 are commercially available materials. Number 5 was obtained in 2 mil strip form, whereas Number 7 was obtained in 2 mil film form.

Elastic sample No. 1 and nonelastic sample Nos. 3, 4 and 6 were fabricated into oriented tapes or ribbons, using a Killion ribbon yarn line (Model Serial No. 3874). This apparatus can be represented by the schematic of FIG. 1 except that a slitter was not utilized.

Table 2 provides a dimensional characterization of the fabricated strip samples used in the evaluation.

Figure 3:
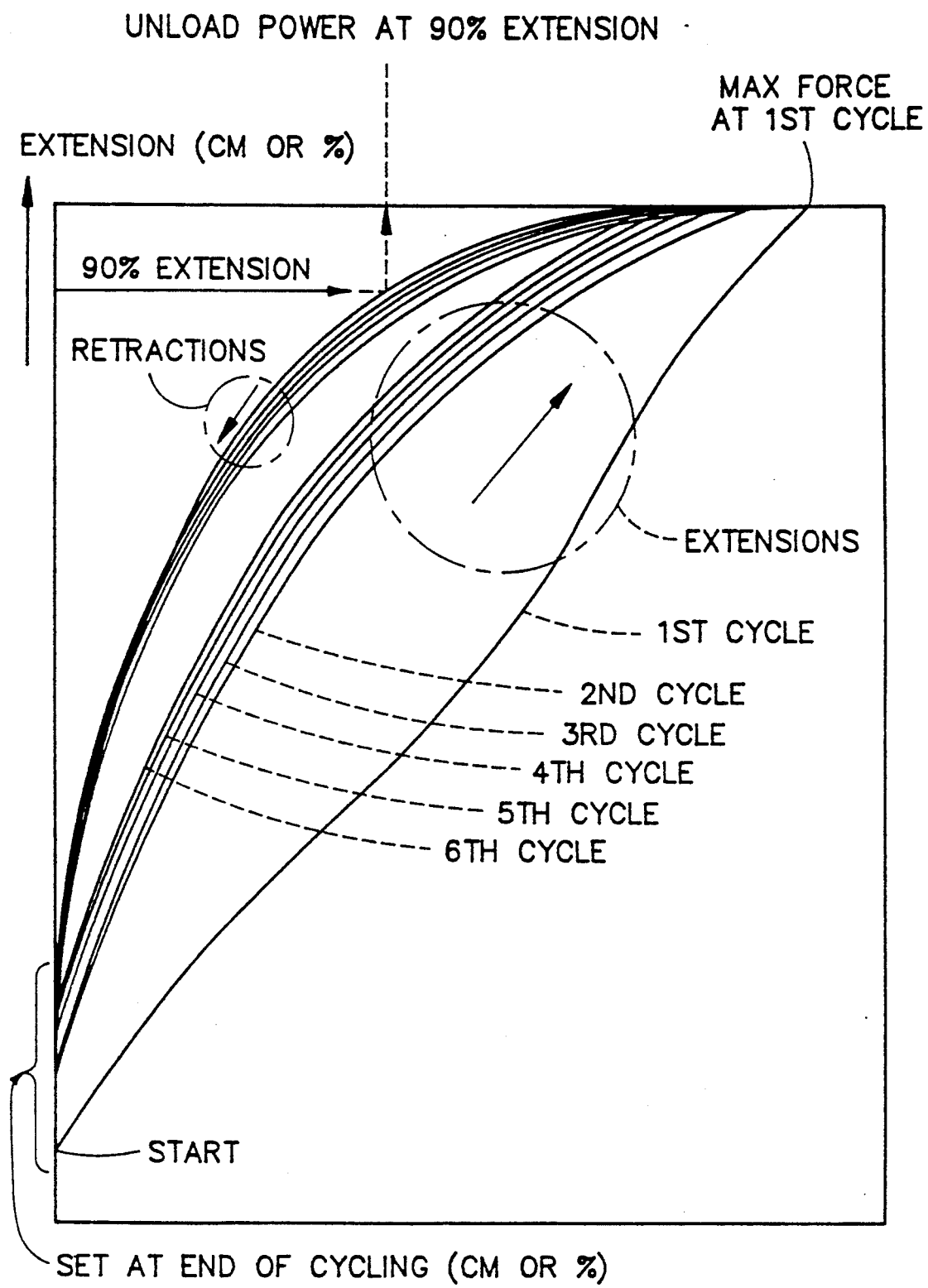
FIG. 3 illustrates the hysterisis testing procedure used for determining the unload power and residual set.

The hysterisis testing procedure used is shown in FIG. 3. The method is based on a procedure described by DuPont in its brochure on its polyether urethane elastic product, T-722A. The testing was conducted on an Instron Model No. 1122. Twelve inch lengths of the sample film strip to be tested were held by the Instron jaws and extended 100% using a cross-head speed of 500 mm/min. Following the extension, the cross head was retracted, also at 500 mm/min, back to the original position. This cycling was conducted six times. The force versus extension curves were plotted (chart speed also 500 mm/min) as is shown in FIG. 3. Key pieces of information that are extracted from these plots are maximum force reached at the end of each extension (lb force), residual set at the end of five cycles (cm, %) and the unload powers measured during the fifth cycle retraction at various elongations (lb force). Generally five lengths were tested for each sample, with mean values over these samples developed.

Figure 4:
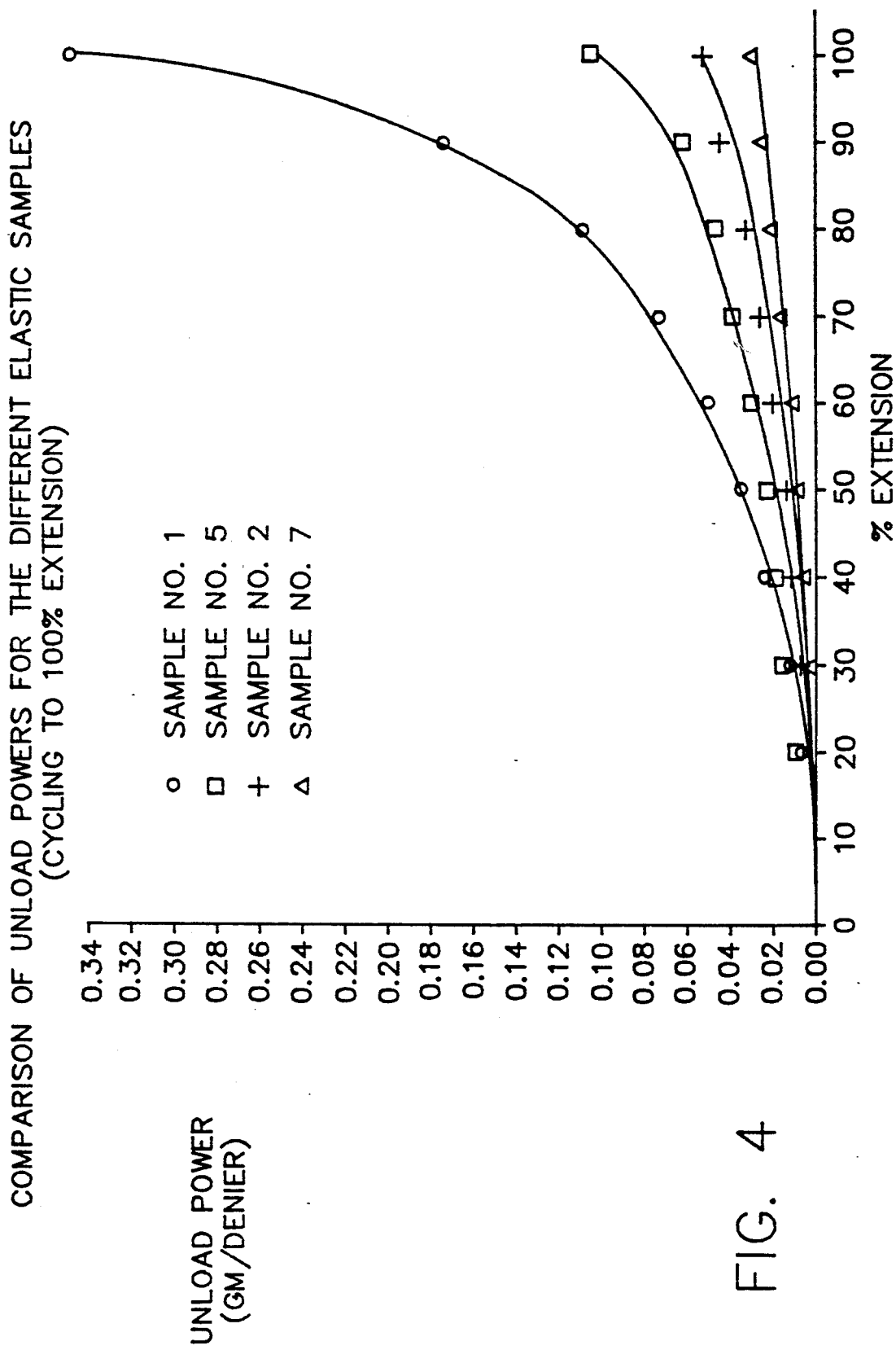
FIG. 4 plots the unload power at various extensions up to 100 percent for elastic sample Nos. 1, 2, 5 and 7.

FIG. 4 plots the unload power at various extensions up to 100 percent for elastic sample Nos. 1, 2, 5 and 7. Sample Nos. 3, 4 and 6 were too crystalline (non-elastic) and did not have sufficient extensibility to survive the repeated cycling to 100 percent. As seen in FIG. 4, the unload power is very dependent on the particular fabrication approach. The same polymer (plastomer of Example 1) can be made to show different unload power values, depending on fabrication technique. The fabrication process of this invention which includes the combination of orientation and annealing, provided a much higher value of unload power than was obtained using a traditional extrusion casting fabrication technique.

Table 4 shows a summary of the hysterisis testing on cycling to 100% extension. The set after 5 cycles appears comparable for the 4 samples, ranging from 15 to 20 percent, per the testing procedure followed. The high unload power and the favorable low set value provided by sample No. 1 (plastomer ribbon), demonstrate the utility of the fabrication process of this invention to provide suitable elastic end products.

Table 3 shows shrinkage measurements at elevated temperatures (i.e. shrinkage of original lengths) on the 4 samples that survived cycling to 100 percent extension. The fabrication process of this invention provides high shrinkage at lower temperatures, which is an advantage in certain elastic applications (compare values for plastomer ribbon versus plastomer cast film strip).

Table 5 quantifies the force at break values and the ultimate elongation values during tensile testing of the tape/film on an Instron Model 1122 with cross head speed of 500 mm/min.

TABLE 1

| DESCRIPTION OF SAMPLES | | |
|---|---|---|
| NUMBER | RESIN DESCRIPTION | TAPE/STRIP FABRICATING DETAILS |
| 1. | Plastomer (2.8 MI, 0.88 D, 23 MI Ratio; C2/C6) | Oriented tape (5:1 draw ratio) produced on ¾ inch Killion ribbon yarn line. |
| 2. | Plastomer (2.8 MI, 0.88 D, 23 MI Ratio; C2/C6) | Cast film; Film cut into strips about 0.6 cm wide for testing |
| 3. | VLDPE (1.4 MI, 0.90 D, 60 MI Ratio; C2/C6) | Oriented tape (5:1 draw ratio) produced on ¾ inch Killion ribbon yarn line. |
| 4. | LLDPE (0.7 MI, 0.922 D, 35 MI Ratio; C2/C6) | Oriented tape (5:1 draw ratio) produced on ¾ inch Killion ribbon yarn line. |
| 5. | T-722A polyether copolymer | 2 mil elastic strip (DuPont Elastic Products Group, Wilmington, Delaware). |
| 6. | VLDPE X-142 (0.9 MI, 0.90 D, 27 MI Ratio; C2/C6) | Oriented tape (5:1 draw ratio) produced on ¾ inch Killion ribbon yarn line, (Polymer from Mitsubishi Petrochemical Co., Japan) |
| 7. | Exxtraflex 120 | Extraflex 120 film (Exxon Film Products, Lake Zurich, Illinois). |

TABLE 2

SAMPLES CHARACTERIZATION

| SAMPLE ID | DENIER (G/9000M) MEAN VALUE* | STRIP WIDTH | STRIP THICKNESS |
|---|---|---|---|
| 1. Plastomer ribbon | 3723 | 0.4 cm (.1575 in) | 0.115 mm (4.49 mil) |
| 2. Plastomer cast film strip | 2480 | 0.6 cm (.2362 in) | 0.05 mm (1.97 mil) |
| 3. VLDPE ribbon | 3450 | 0.4 cm (.1575 in) | 0.109 mm (4.29 mil) |
| 4. LLDPE ribbon | 3046 | 0.4 cm (.1575 in) | 0.087 mm (3.43 mil) |
| 5. DuPont Polyether copoly film strip | 3668 | 0.7 cm (.2756 in) | 0.0521 mm (2.05 mil) |
| 6. Mitsubishi VLDPE X-142 Ribbon | 2682 | 0.3 cm (.1181 in) | 0.102 mm (4.02 mil) |
| 7. Exxtraflex 120 Film Strip | 2682 | 0.6 cm (.2362 in) | 0.051 mm (2.01 mil) |

*value used in calculations in this study.

TABLE 3

SHRINKAGE MEASUREMENT

| SAMPLE ID | SHRINKAGE AT 52° C. (125° F.) | | SHRINKAGE AT 66° C. (150° F.) | | SHRINKAGE AT 79° C. (175° F.) | | SHRINKAGE AT 93° C. (200° F.) | |
|---|---|---|---|---|---|---|---|---|
| | FINAL LENGTH | % SHRINKAGE | FINAL LENGTH | % SHRINKAGE | FINAL LENGTH | % SHRINKAGE | FINAL LENGTH | % SHRINKAGE |
| Plastomer ribbon | 1. 16.60 cm | 45.5 | 1. 11.7 cm | 61.6 | 1. 8.6 cm | 71.8 | 1. 7.3 cm | 76.0 |
| | 2. 16.80 cm | 44.9 | 2. 11.4 cm | 62.6 | 2. 8.1 cm | 73.4 | 1. 8.4 cm | 72.4 |
| DuPont T-722A | 1. 29.9 cm | 1.9 | 1. 29.3 cm | 3.9 | 1. 28.6 cm | 6.2 | 1. 28.2 cm | 7.5 |
| Plastomer cast film strip | 1. 29.3 cm | 3.9 | 1. 27.8 cm | 8.8 | 1. 20.0 cm | 34.4 | 1. 18.5 cm | 39.3 |
| | 2. 29.3 cm | 3.9 | 2. 27.6 cm | 9.4 | 2. 19.5 cm | 36.0 | 2. 18.5 cm | 39.3 |
| Exxtraflex 120 film strip | 1. 29.8 cm | 2.2 | 1. 28.5 cm | 6.5 | 1. 26.5 cm | 13.1 | 1. 20.6 cm | 32.4 |
| | 2. 29.9 cm | 1.9 | 2. 28.6 cm | 6.2 | 2. 26.3 cm | 13.7 | 2. 20.3 cm | 33.4 |

NOTES:
Shrinkage testing conducted in circulating air ovens
Initial (starting) sample length for all samples was 12 in (or 30.48 cm)
Samples strips enclosed in paper envelopes (perforated to promote heated air circulation), to restrain sample movement in circulating air oven. Each sample-in-envelope suspended in oven chamber for 5 min.
Samples dusted with talc powder to prevent sticking in oven at the test temperatures

TABLE 4

HYSTERESIS TESTING

| | RIBBON PLASTOMER (Cycling to 100% Extension) LB | PLASTOMER CAST FILM STRIP (Cycling to 100% Extension) LB | T-722A FILM STRIP (Cycling to 100% Extension) LB | EXXTRAFLEX 120 FILM STRIP (Cycling to 100% Extension) LB |
|---|---|---|---|---|
| MAX FORCE ON CYCLE NO. | | | | |
| 1 | 3.5150 | 0.3170 | 0.9600 | 0.1971 |
| 2 | 3.1963 | 0.3116 | 0.8960 | 0.1929 |
| 3 | 3.0475 | 0.3082 | 0.8694 | 0.1899 |
| 4 | 2.9450 | 0.3060 | 0.8494 | 0.1877 |
| 5 | 2.8775 | 0.3050 | 0.8384 | 0.1859 |
| 6 | 2.8275 | 0.3040 | 0.8278 | 0.1849 |
| UNLOAD POWER (5TH CYCLE) | | | | |
| At 10% Elong | 0.0000 | 0.0000 | 0.0000 | 0.0000 |
| At 20% Elong | 0.0050 | 0.0068 | 0.0030 | 0.0084 |
| At 30% Elong | 0.0750 | 0.0358 | 0.0940 | 0.0268 |
| At 40% Elong | 0.1713 | 0.0610 | 0.1474 | 0.0429 |
| At 50% Elong | 0.2788 | 0.0886 | 0.1954 | 0.0569 |
| At 60% Elong | 0.4125 | 0.1172 | 0.2480 | 0.0729 |
| At 70% Elong | 0.5975 | 0.1486 | 0.3030 | 0.0915 |
| At 80% Elong | 0.8913 | 0.1876 | 0.3826 | 0.1131 |
| At 90% Elong | 1.4313 | 0.2340 | 0.5000 | 0.1395 |
| At 100% Elong | 2.8762 | 0.3048 | 0.8384 | 0.1863 |
| Original Length | 30.6175 | 30.8200 | 30.9300 | 30.9500 |
| Set After 5 Cycles (CM) | 6.1125 | 5.3780 | 4.4950 | 5.1200 |
| (%) | 19.9600 | 17.4380 | 14.5350 | 16.5380 |

NOTES:
1. Sample values shown are mean values over several runs conducted on each sample.
2. Max force and Unload power can be also expressed in the units gm/denier and cN/dTEX.

TABLE 5

| | ULTIMATE TENSILE STRENGTH* & ELONGATION MEASUREMENTS | | |
|---|---|---|---|
| SAMPLE | TEST SPECIMEN STARTING LENGTH (cm) | FORCE AT BREAK (lbf) | ELONGATION AT BREAK (%) |
| 1. Plastomer Ribbon | 7.5 | 12.6 | 230 |
| 2. Plastomer Cast Film Strip | 7.5 | 1.27 | 562 |
| 3. VLDPE Ribbon | 7.5 | 12.0 | 112 |
| 4. LLDPE Ribbon | 7.5 | 12.6 | 93 |
| 5. T-222A (DuPont) | 7.5 | 4.63 | 755 |
| 6. VLDPE X-142 (Mitsibishi Chem.) | 7.4 | 9.0 | 134 |
| 7. Exxtraflex-120 (Exxon) | 7.5 | did not break | >1000 |

*actually, force at break (lbf) values, from Instron chart recording. Instron cross-head speed 500 mm/min.

I claim:

1. A process for improving the unload power of a precursor elastic film comprising orienting and annealing the film wherein the orientation is to a draw ratio in the range of about 2:1 to about 20:1 and the annealing is at a temperature between the softening point and melting point of the elastic film and the precursor film comprises a plastomer selected from the group consisting of ethylene polymerized with at least one comonomer selected from the group consisting of $C_3$ to $C_{20}$ alpha-olefins and $C_3$ to $C_{20}$ polyenes, the plastomer has a density in the range of about 0.855 g/cm$^3$ to about 0.9 g/cm$^3$, a melt index in the range of about 0.2 to about 100 dg/min, a molecular weight distribution in the range of about 1.5 to about 30 and a Composition Distribution Breadth Index (CDBI) of at least about 45 percent.

2. The process of claim 1 wherein the precursor film is produced by slit-die extrusion.

3. The process of claim 1 wherein the precursor film is produced by blown film extrusion.

4. The process of claim 1 wherein the alpha-olefin is selected from the group consisting of propylene, 1-butene, 1-pentene, 1-hexene, 1-octene and 1-dodecene.

5. The process of claim 1 wherein the plastomer has a density in the range of about 0.860 g/cm$^3$ to about 0.890 g/cm$^3$, a melt index in the range of about 0.5 to about 50, a molecular weight distribution in the range of about 1.8 to about 10, and a Composition Distribution Breadth Index (CDBI) at least about 60 percent.

6. The process of claim 1 wherein the polyene is a diene selected from the group consisting of straight chain dienes, branched chain dienes and cyclic hydrocarbon dienes.

7. The process of claim 6 wherein the diene is selected from the group consisting of 1,3-butadiene, 1,4-hexadiene, 1,6-octadiene, 5-methyl-1,4-hexadiene, 3,7-dimethyl-1,6-octadiene, 3,7-dimethyl-1,7-octadiene, mixed isomers of dihydro myrcene and dihydroocimene, 1,3-cyclopentadiene, 1,4-cylcohexadiene, 1,5-cyclooctadiene and 1,5-cyclododecadiene, tetrahydroindene, methyl tetrahydroindene, dicyclopentadiene, bicyclo-(2,2,1)-hepta-2-5-diene, 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene.

8. The process of claim 1 wherein the plastomer comprises in the range of about 65 mole percent to about 93 mole percent ethylene (based on the total moles of monomer).

9. The process of claim 1 wherein the plastomer comprises in the range of about 73 mole percent to about 88 mole percent ethylene (based on the total moles of monomer).

10. The process of claim 4 wherein the plastomer has an ethylene crystallinity less than about 20 percent.

11. An elastic film having been orientated to a draw ratio in the range of about 2:1 to about 20:1 said film comprising a plastomer selected from the group consisting of ethylene polymerized with at least one comonomer selected from the group consisting of $C_3$ to $C_{20}$ alpha-olefins and $C_3$ to $C_{20}$ polyenes, said plastomer having a density in the range of about 0.855 g/cm$^3$ to about 0.9 g/cm$^3$, a melt index in the range of about 0.5 to about 50, and a composition distribution breadth index of at least about 45 percent.

12. The elastic film of claim 11 wherein the plastomer has a density in the range of about 0.860 g/cm$^3$ to about 0.890 g/cm$^3$, a melt index in the range of about 0.5 to about 50, a molecular weight distribution in the range of about 1.8 to about 10, and a Composition Distribution Breadth Index (CDBI) at least about 60 percent.

13. The elastic film of claim 11 wherein the polyene is a diene selected from the group consisting of straight chain dienes, branched chain dienes and cyclic hydrocarbon dienes.

14. The elastic film of claim 13 wherein the diene is selected from the group consisting of 1,3-butadiene, 1,4-hexadiene, 1,6-octadiene, 5-methyl-1,4-hexadiene, 3,7-dimethyl-1,6-octadiene, 3,7-dimethyl-1,7-octadiene, mixed isomers of dihydro myrcene and dihydroocimene, 1,3-cyclopentadiene, 1,4-cylcohexadiene, 1,5-cyclooctadiene and 1,5-cyclododecadiene, tetrahydroindene, methyl tetrahydroindene, dicyclopentadiene, bicyclo-(2,2,1)-hepta-2-5-diene, 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene.

15. The elastic film of claim 11 wherein the alpha-olefin is selected from the group consisting of propylene, 1-butene, 1-pentene, 1-hexene, 1-octene and 1-dodecene.

16. The elastic film of claim 11 wherein the plastomer comprises in the range of about 65 mole percent to about 93 mole percent ethylene (based on the total moles of monomer).

17. The elastic film of claim 11 wherein the plastomer comprises in the range of about 73 mole percent to about 88 mole percent ethylene (based on the total moles of monomer).

18. The elastic film of claim 11 wherein the plastomer has an ethylene crystallinity less than about 20 percent.

19. An elastic film having improved unload power, comprising the product of orienting and annealing a precursor elastic film to a draw ratio in the range of about 2:1 to about 20:1 and the precursor film comprises a plastomer selected from the group consisting of ethylene polymerized with at least one comonomer selected from the group consisting of C3 to C20 alpha-olefins and C3 to C20 polyenes, the plastomer has a density in the range of about 0.855 g/cm3 to about 0.9 g/cm3, a melt index in the range of about 0.2 to about 100 dg/min, a molecular weight distribution in the range of about 1.5 to about 30, and a Composition Distribution Breadth Index (CDBI) of at least about 45 percent.

20. The process of claim 19 wherein the plastomer has a density in the range of about 0.860 g/cm$^3$ to about 0.890 g/cm$^3$, a melt index in the range of about 0.5 to about 50, a molecular weight distribution in the range of about 1.8 to about 10, and a Composition Distribution Breadth Index (CDBI) at least about 60 percent.

21. The process of claim 19 wherein the polyene is a diene selected from the group consisting of straight chain dienes, branched chain dienes and cyclic hydrocarbon dienes.

22. The elastic film of claim 21 wherein the diene is selected from the group consisting of 1,3-butadiene, 1,4-hexadiene, 1,6-octadiene, 5-methyl-1,4-hexadiene, 3,7-dimethyl-1,6-octadiene, 3,7-dimethyl-1,7-octadiene, mixed isomers of dihydro myrcene and dihydroocimene, 1,3-cyclopentadiene, 1,4-cylcohexadiene, 1,5-cyclooctadiene and 1,5-cyclododecadiene, tetrahydroindene, methyl tetrahydroindene, dicyclopentadiene, bicyclo-(2,2,1)-hepta-2-5-diene, 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene.

23. The elastic film of claim 19 wherein the alpha-olefin is selected from the group consisting of propylene, 1-butene, 1-pentene, 1-hexene, 1-octene and 1-dodecene 24. The elastic film of claim 19 wherein the plastomer comprises in the range of about 65 mole percent to about 93 mole percent ethylene (based on the total moles of monomer).

25. The elastic film of claim 19 wherein the plastomer comprises in the range of about 73 mole percent to about 88 mole percent ethylene (based on the total moles of monomer).

26. The elastic film of claim 19 wherein the plastomer has an ethylene crystallinity less than about 20 percent.

* * * * *